(12) United States Patent
Fedele et al.

(10) Patent No.: US 11,734,450 B1
(45) Date of Patent: Aug. 22, 2023

(54) SYSTEM AND METHOD FOR ANONYMIZING USER SEARCHING

(71) Applicant: Demand PAT LLC, New Hyde Park, NY (US)

(72) Inventors: Joseph Fedele, New Hyde Park, NY (US); Harpreet GeeKee, Oakville (CA); Richard Oh, New York, NY (US); Gordon Kessler, Mount Kisco, NY (US)

(73) Assignee: Demand Pat LLC, New Hyde Park, NY (US)

( * ) Notice: Subject to any disclaimer, the term of this patent is extended or adjusted under 35 U.S.C. 154(b) by 409 days.

(21) Appl. No.: 17/147,390

(22) Filed: Jan. 12, 2021

(51) Int. Cl.
*G06F 16/9536* (2019.01)
*G06F 21/62* (2013.01)
*G06F 16/9538* (2019.01)
*G06N 5/04* (2023.01)
*G06N 20/00* (2019.01)
*G06F 16/9535* (2019.01)

(52) U.S. Cl.
CPC ...... *G06F 21/6254* (2013.01); *G06F 16/9535* (2019.01); *G06F 16/9536* (2019.01); *G06F 16/9538* (2019.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,551,241 B1 * | 1/2023 | Figueroa | G06Q 30/0206 |
| 2013/0073388 A1 * | 3/2013 | Heath | G06Q 50/01 |
| | | | 705/14.53 |
| 2021/0134434 A1 * | 5/2021 | Riley | G16H 50/30 |
| 2022/0245699 A1 * | 8/2022 | Wadhwa | G06Q 30/0629 |

* cited by examiner

*Primary Examiner* — Cai Y Chen
(74) *Attorney, Agent, or Firm* — Gordon Kessler

(57) ABSTRACT

A system and method are provided implementing user searching. The method includes receiving information from a potential user by an onboarding system including one or more attributes for attaching the user to one or more communities with similar attributes, and receiving one or more search terms from the user by a search system. A processor then performs a search based upon the received search terms and the one or more communities to which the user is attached, and a response to the search is displayed to the user on a display. A user preference to the presented response is confirmed by a preference system, and one or more communities to which the user is attached are dynamically updated, along with updating the attributes of the communities to which the user is attached in response to the user preference.

18 Claims, 14 Drawing Sheets

SYSTEM AND METHOD FOR ANONYMIZING USER SEARCHING

BACKGROUND

Users enjoy searching and purchasing via Ecommerce through the Internet. However, privacy is a problem, as evidenced by the large number of new data privacy regulations being promulgated around the world and the numerous news articles related to data breaches. While these regulations typically indicate what a data controller or data processor must do in order to safeguard collected personal information, in order to benefit from the use of the Internet to search for information, interact with suppliers of goods and services, and purchase those goods and services, users must still provide personally identifiable information to these provider. This data may be subject to a breach, or simply used in a way that benefits not the user, but rather the seller or provider of goods and services. It would therefore be beneficial to provide a solution that overcomes the drawbacks of this traditional use model of the Internet.

SUMMARY

A system and method are presented whereby the user is in control of their personal information and is not only able to determine what information is presented, but also to whom and for how long. Therefore, users are preferably able to confirm whether they wish to provide their personal information to sellers and manufacturers of goods and services, be anonymous to the world only while providing personal information to the search system (and providing this information to sellers and manufacturers of goods and services when they are ready to complete a transaction), or even remain anonymous to the search system as well when performing searches, and again only providing this information to the search system and sellers and manufacturers of goods and services at the time of completion of a transaction.

The authors of the present disclosure present a solution that transforms eCommerce from purchasing to procuring. Traditionally, user information is utilized, manipulated and leveraged over and over again by eCommerce, Web, ISP, Data aggregators etc with no visibility or permission from the user, with sole benefit to enable the eCommerce/data aggregator to monetize such data for marketing rather than the users for their consumption, and with no further benefit to the user. The standards like GDPR have been put in place due to the misuse of the data which is collected without users' consent and without any advantage/personal benefit to the user. The privacy of the user information, user behavior, user wants/needs/desires are all collected and manipulated without any benefit to the user or without any permission from the user, thus wrestling control of user data from the users themselves.

Furthermore, the disclosure describes a system in which users are able to remain anonymous to suppliers or manufacturers of goods while still receiving offers to procure goods from these suppliers and manufacturers, and even have searching for these goods and services be based on wants/needs/desires of each user. By aligning each single user with other users into "communities" of users sharing some similar characteristic, it is possible to determine goods that may be appropriate for a particular user based upon searches and procurements from other users. Therefore, the more anonymous a user chooses to remain (and therefore the less amount of specific user information available) the greater the use of aggregated information gleaned from other users in one or communities to which the present user has been assigned may be relied upon in order to properly present goods, services, or other information to the present user to aid in searching and procurement. Thus, if the user wishes to remain anonymous to the search system, information that is provided by the user may place them into a particular extrapolated community/demographic category in order to surmise wants, needs and desires. If, on the other hand, the user is willing to provide personalized information to the search system (even while remaining anonymous to the outside world), specific wants, needs, and desires of the individual user can be indicated, and this provided information will place the user into one or more particular extrapolated communities or demographic categories. Therefore, the targeted disclosure of the user's information is of greater value to the user when they retain complete control of their privacy and are thus able to maintain protection against various threats, such as identity theft, phishing etc.

These communities/generalization categories provide actionable information for presentation of desired content, whether this be in response to an Internet general search, or a search on a particular website, application or other mode of searching presented by a provider of goods and services. Responses of the user to the presented actionable information may allow for recategorization of community/generalization categories, thus not simply relying on initial categories, but taking into account the actual reaction to information presented to the user.

In an alternative embodiment and to allow user retained control over dissemination and use of their personal information, the user may interact with a system that in fact collects personal information, but then provides a mechanism by which the user is able to define which information may be shared with which potential retail or procurement partners, and also when and for how long this information may be shared. This disclosure describes such a system, allowing for potentially targeted and discounted procurement while the user remains anonymous to manufacturers of goods until the time where the user and manufacturer must arrange for sale and delivery of the goods.

A system and method for anonymizing consumer searching is also provided that allows for user control over personal information in the particular realm of consumer purchasing of goods and services, and where the user is able to determine what information is presented, to which providers of goods and services, when the information is presented, and additionally for how long. Therefore, users are preferably able to confirm whether they wish to be anonymous to the world only while providing personal information to the search system, or alternatively may also remain anonymous to the search system as well.

The disclosure further describes a system whereby users (potential purchasers) and manufacturers of goods and services are put into contact without intermediaries, and well in advance of a necessary purchase time, so that that cost of production and delivery can be reduced, thus benefiting both the manufacturer and purchaser. As users are potentially able to interact with providers and other original sources of goods and services directly, and at a time before the goods and services are produced, the completion of such an interaction allows a supplier to reduce cost for providing goods and services just in time and on demand, so no storage, distributer, middlemen, reagaggregation of demand, redundant inventory and occupancy, financing costs, etc. is necessary. The manufacturer may further offer for sale goods or services with sufficient lead time that these goods can be manufactured when a factory, for example, may expect to be underutilized, thus allowing for the manufacturer to request a lower price for the guaranteed additional purchases. Savings may be shared with the purchaser in order to encourage purchasing.

This disclosure further presents and describes a perpetual inventory system between consumer and manufacturer. Thus, the switch from purchasing to procurement, effectively providing a universal ERP with new players: consumer, manufacturer and third party logistics providers. By cutting out the wholesalers. middlemen, storage requirements, etc. and by providing advance manufacturing availability to consumers, costs can be avoided and prices reduced. The system therefore allows individuals/groups to order directly from manufacturers' live perpetual inventory in shorter periods of time, while over longer periods of time (for example 30 days or longer), manufacturers can respond to consumers' live perpetual demand, and can properly apply the manufacturers' inventory and capability to produce.

BRIEF DESCRIPTION OF THE DRAWINGS

The invention will be described making reference to the drawings, in which:

FIG. 4 is a flowchart diagram depicting a process for user log on;

DESCRIPTION

Figure 1:
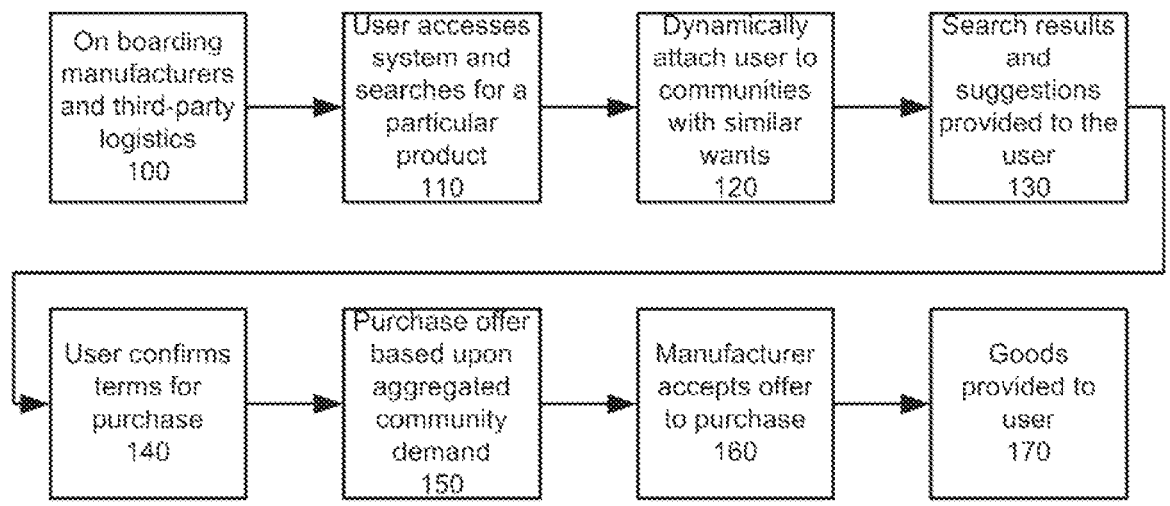
FIG. 1 is a high-level flowchart outlining the steps involved in a supply-driven offer.

In accordance with various embodiments of the invention, the term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer, mobile, or other electronic device designed to receive information input by a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any subject matter described in this disclosure or on the scope of what may be claimed, but rather as descriptions of features that may be specific to particular embodiments of the subject matter described in this disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Figure 15:
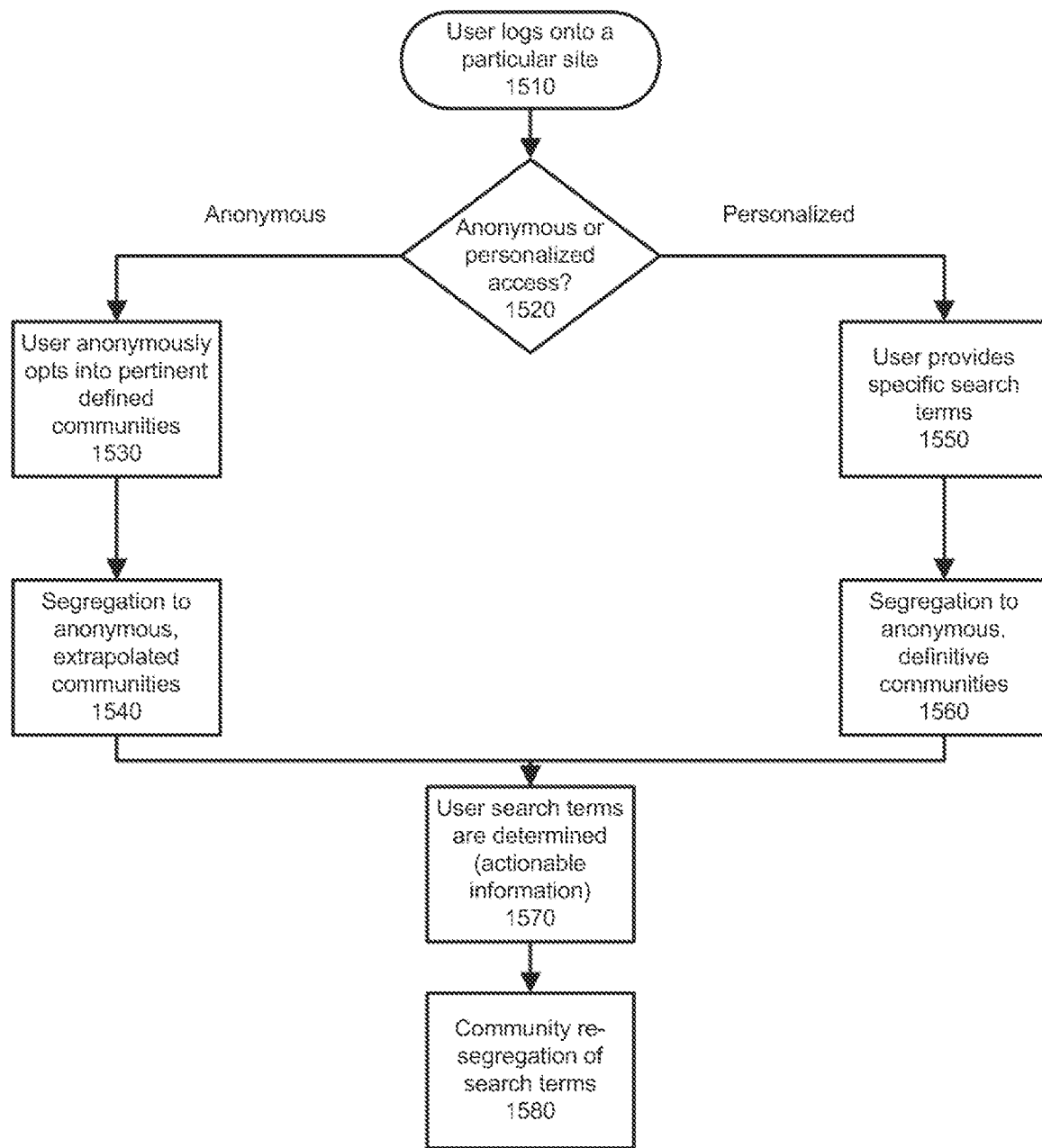
FIG. 15 is a high-level flowchart diagram depicting an overall process for a user remaining anonymous or not when performing searching.

Referring first to FIG. 15, a high-level flowchart diagram is shown depicting the overall process of the method and system in accordance with an embodiment of the invention. A user logs on to a particular desired website, or otherwise enables a search as the process starts at 1510. Processing then flows to step 1520 where the user is queried whether they wish to remain anonymous or provide personalized information as they access the system. If the query at step 1520 is answered so that the user indicates a desire to remain anonymous, processing then proceeds to step 1530 where the user preferably opts into one or more defined communities, or is otherwise assigned to the one or more communities. The processing of the transactions and assignments to the one or more communities preferably leverages a hybrid architecture of the distributed compute, with enhanced central management and control. For example, the transactions leverage the compute power of the consumer end devices, network/data center based edge devices and distributed data center hierarchies to provide services that satisfies user's wants, needs and desires based on multi-parameter inputs such as behaviour, demographics, region, and quality of the products which needs to be procured These communities are preferably based upon characteristics that a user might have in common with other members of the community. For example, a user might be searching for a used car, be attending someone's birthday, be expecting a baby, or the like.

Processing then continues at step 1540 where the user may be further segregated into one or more anonymous extrapolated communities from which the user may benefit. Once all of the appropriate communities have been set, processing continues at step 1570 where user search terms are determined as actionable information, and various searches can be run for the user in an automated or semi-automated fashion based upon the communities to which the user has subscribed or been otherwise assigned. Finally, at step 1580, in accordance with user responses to information provided in response to the search terms associated with each of the one or more communities, community search terms are updated. This update is preferably performed dynamically, which may refine, define, or create new communities attributes or requirements of common wants, needs and desires.

If on the other hand, if the inquiry at step 1520 indicates that the user prefers to provide personal information, processing proceeds at step 1550 where one or more search terms may be provided directly by the user. In addition to using these search terms, the user is also segregated into one or more anonymous, definitive communities at step 1560 in a manner similar to that described above, but based on additional personal information. Finally, processing continues at steps 1570 and 1580 as described above. Therefore, a user is able to receive information from a search based upon the characteristics and amount of data they wish to share with an online service provider. Even known users are able to limit the sharing of their known information with external third parties, thus reducing the possibility that their personal information will be available for unwanted marketing purposes. While the user who provides precise search terms may receive more directly relevant information, the ability to receive information in response to an indication of belonging to one or more communities, and the extrapolation of this information into other communities in which the user might be interested, allows for the receipt of information in a far more anonymous manner.

Figure 16:
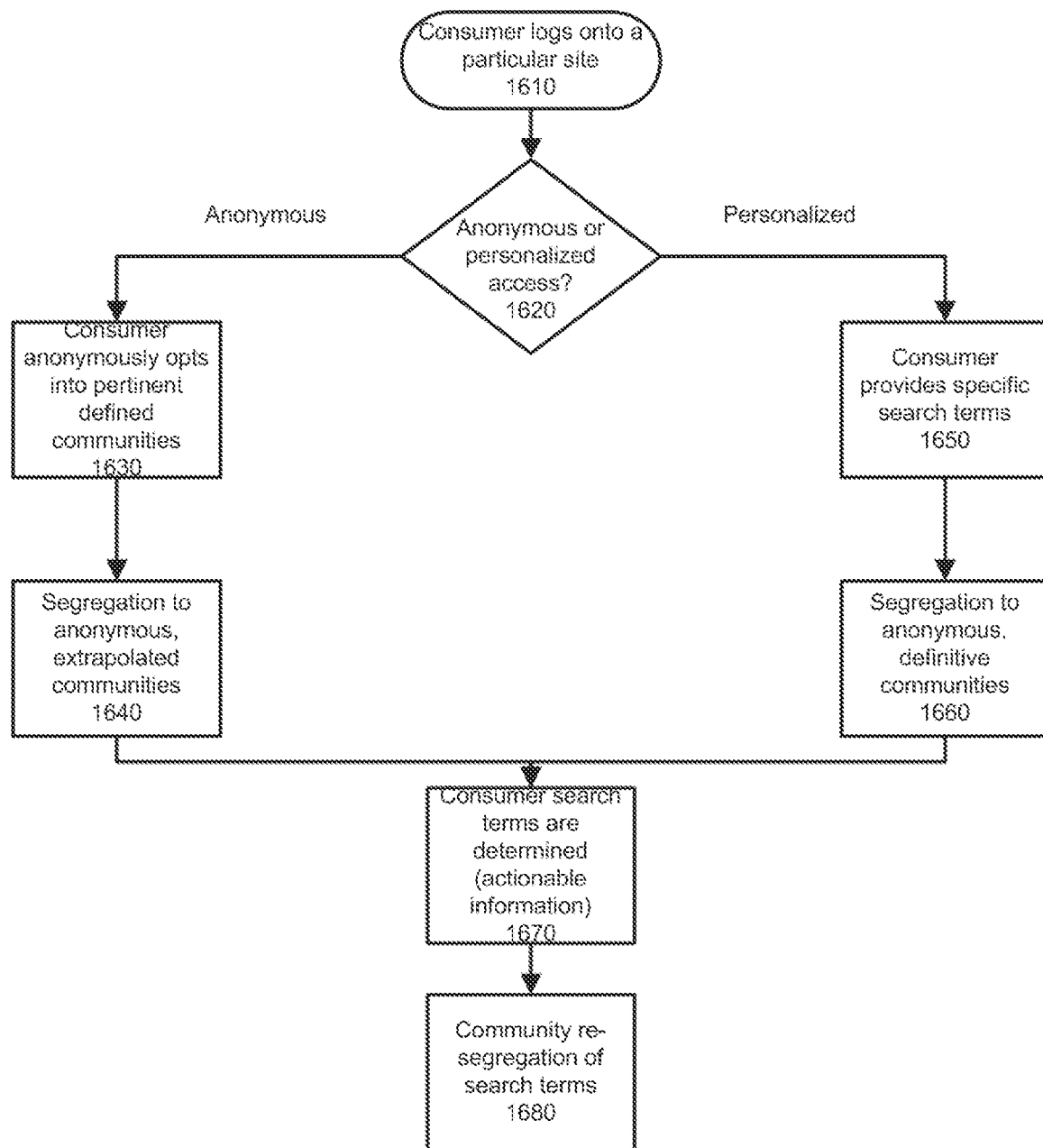
FIG. 16 is a flowchart diagram depicting an overall process for a consumer remaining anonymous or not when performing searches for a good or service.

Referring next to FIG. 16, the application of this system and method to a consumer setting is presented. A high level flowchart diagram is shown depicting the overall process of the method and system in accordance with an embodiment of the invention. A consumer logs on to a particular desired website in order to purchase one or more goods as the process starts at 1610. Processing then flows to step 1620 where the Consumer is queried whether they wish to remain anonymous or provide personalized information as they access the system. Indeed, the consumer is able to choose to remain anonymous initially to even the search system, or to provide personalized information to the search system only at this point in time. In the event such personalized information is provided, the consumer is further able to remain anonymous to a manufacturer until after they have received and accepted an offer to purchase a good or service. In a particular embodiment of the invention, if the consumer preferably joins as a member in order to provide personal information, a unique user ID is created, allowing the consumer to opt in or out of which information he or she wishes to share with the search system (rules and policies) (digital contract) or with manufacturers of goods and services, and when to share with them. The consumer may also limit how this provided information is shared with manufacturers, thus ensuring that the manufacturer is unable to pinpoint their identity. For example, the consumer may allow for selective access to personalized information by only particular manufacturers (perhaps they have done business together previously) while remaining anonymous to others. Implementation of such a selective system for allowing access to information may be implemented by a key management system, including single or multiple encryption schemes. In such a manner, certain portions of provided personal information may be selectively shared based upon one or more defined policies, which allow for definition of which fields of information are accessible by which other parties. The system and method in accordance with the invention also contemplates the ability to subsequently be granted further access or even restrict continued or future access. Through unique assignment and routing of encryption keys, proper information management allows the consumer to withdraw access to information that has already been provided to a manufacturer or other party in accordance with one embodiment of the inventive system and method. The system and method provide a unique combination of access policy, use of encryption keys, and execution of management of the system in order to allow unprecedented control over one's personally identifiable information.

If the query at step 1620 is answered so that the consumer indicates a desire to remain anonymous, processing then proceeds to step 1630 where the consumer preferably opts into one or more defined communities, or may be assigned thereto in a manner similar to that noted above with respect to FIG. 15. These communities are preferably based upon characteristics that a consumer might have in common with other members of the community. For example, a consumer might be searching for a used car, attending someone's birthday, expecting a baby, or the like. By self selecting into a particular community, it is anticipated that the wants, needs, and desires of other consumers in the community will be similar to the wants, needs, and desires of the consumer then opting in.

Processing then continues at step 1640 where the consumer may be further segregated into one or more anonymous dynamically extrapolated communities from which the consumer may benefit. Such segregation is preferably performed by an algorithm that determines the overlap or predictions of wants, needs, and desires based upon selected communities and the user's interface behavior with the platform and channel. For example, opting into a community for those expecting a baby, and for those searching or parking in a large city may also be opted into a community for infant strollers or carriers that are appropriate for use in smaller quarters, and would likely not be included in a community providing information about lawn mowers. Thus, the system and method presented herein preferably provides unique predictions and recommendations based on custom grouping algorithms dynamically changing with the user's particular behavior with the platform and channel which match a consumer with one or more communities, and enables aggregation based on collective community wants, needs, and desires.

Once all of the appropriate communities have been set, processing continues at step 1670 where consumer wants, needs, and desires are determined as actionable information, and various searches for goods or services can be run for the anonymous consumer in an automated or semi-automated fashion based upon the communities to which the user has subscribed, and an algorithm that dynamically extrapolates potential other communities and any accumulated wants, needs, and desires. Thus, a unique prediction and recommendation based on a custom grouping algorithm-matched with manufacturing capabilities and available sku's, etc., may further be provided so the consumers are provided opportunities and offers from manufacturers or providers of services in an efficient manner, allowing for just in time production.

Finally, at step 1680, in accordance with consumer responses to information provided in response to the opportunities and offers associated with each of the one or more communities, community wants, needs, and desires are updated, possibly adjusting the characteristics of a particular community, or generating a new community.

If on the other hand, if the inquiry at step 1620 indicates that the consumer prefers to provide personal information, processing proceeds at step 1650 where one or more consumer wants, needs, or desires are provided directly by the consumer, therefore including specific actionable information. In addition to using these provided wants, needs, and desires, the consumer is also segregated into one or more anonymous, definitive communities at step 1660, and the wants, needs, and desires are thus also attributed to the consumer for search purposes in a manner similar to that noted above with respect to FIG. 15. Finally, processing continues at steps 1670 and 1680 as described above, but relying not only on the community wants, needs, and desires, but also those provided by the consumer.

It is important to note that in an embodiment of the disclosure, in either situation, information of the consumer may be held anonymous from the manufacturer/provider of goods or services. By providing consumer wants, needs, and desires, (and therefore answering the ever elusive answers to Who, What, Where or When) these manufacturers/providers of services may make custom offers to the consumer in a manner that is extremely efficient relative to all other existing supply chains as they can provide goods or services on a just in time basis, avoiding redundant non value added distribution systems, inventories and related costs, uncertainty for stocking retail shelves, and the like. Preferably, only after the consumer has reviewed and accepted a particular offer will restricted personal information of the consumer be shared if such consumer finds there is a relevant benefit to such consumer, and as noted above, only as much information as the consumer wishes to share. Therefore, a user is able to receive information from one or more manufacturers/providers of goods or services based upon the characteristics and amount of data they wish to share with an online service provider. While the consumer who provides precise search terms may receive more directly relevant information, the ability to receive offers from one or more manufacturers/providers of goods or services in response to an indication of belonging to one or more communities, and the extrapolation of this information into other communities in which the consumer might be interested, allows for the receipt of offers, and ultimately the consummation of a commercial transaction, in a far more anonymous manner that empowers the consumer to determine what is of relevant personal benefit to them.

The implementation of such a method and system not only benefits consumers in allowing for anonymous searching and receipt of offers, but also greatly improves the cost structure of manufacturers and their knowledge of the wants, needs, and desires of consumers, thus further allowing for a reduction in cost, as certainty brings extremely relevant efficiency, perhaps as much as 20-50% savings.

In order to implement the information protecting method and system described above, reference is now made to FIG. 1, in which a high-level flowchart outlining the steps involved in a supply-driven offer will be described. Such a supply driven offer fundamentally shifts the mechanism for determining what products are manufactured, and for how much they are sold. Rather than retailers and other industry intermediaries accumulating market and other indicia of demand, and then determining ahead of time the products to be manufactured by manufacturers, demand driven markets allow the consumer to directly convey demand to manufacturers, therefore not only cutting out the intermediaries, but also allowing the consumer to maintain control of their data and with whom it is shared. Manufacturers also benefit from this direct relationship with consumers as they are immediately and directly made aware of the wants needs and desires of consumers, are able to specifically tailor their supply and manufacturing to these wants, needs and desires (including timing of manufacture and delivery) and also reduce cost to the consumer while increasing their profit when the intermediaries and other friction is removed from the relationship with the consumer.

Such a direct relationship may have multiple further benefits. For example, instead of loyalty programs residing with retail establishments, they could be maintained by manufacturers and provided directly to consumers. Thus, such programs would follow the airline industry where consumers are encouraged to continue to purchase their services from a single airline because of the benefits from loyalty programs. Manufacturers would become an essential piece and owner of the transaction with consumers, rather than a provider of goods that can be swapped out by retailers as soon as another manufacturer can be found.

Furthermore, instead of guessing significantly in advance what consumers will want to purchase next season based on information from industry intermediaries, and in a system where if those intermediaries are wrong, the manufacturer may be stuck with the excess inventory, manufacturers will hear directly the wants, needs and desires from consumers and can make offers directly to them. These conveyed wants needs and desires will fundamentally affect supply-demand curves and change terms upon which manufacturers and consumers are willing to enter into transactions. By shifting the demand curve, manufacturers can similarly shift the supply curve to meet these known demand specifications. Lead times for delivery are part of the equation so that manufacturers can deliver goods directly to consumers at a particular time, with particular specifications, and in particular volume that is acceptable to all parties (i.e. manufacturers can efficiently produce and deliver the goods while consumers are given a cost effective price upon agreement to these terms. The method and system described below will allow for the implementation of such a system.

Each of the elements described in FIG. 1 will be further outlined below. As is shown in FIG. 1, various manufacturers of goods, suppliers of services, and third party logistics suppliers are preferably onboarded onto the provided system for aggregating demand at step 100. This and other prerequisites for enabling such a system will be described below. Once set up, a user is able to access the system and search for a particular product at step 110. The details on how a user performs such a search will be described below. Processing then preferably continues at step 120 where the user is preferably dynamically attached to one or more communities of other users who may have similar wants/needs/desires. The details of such communities are similarly described below.

After searches are performed, processing passes to step 130 where search results and other product or services suggestions are preferably provided to the user. If the user desires to purchase any of the provided items, the user then confirms the terms for purchasing the items at step 140. As will be described in greater detail below, these terms may be based upon a single user request, or may be based upon an aggregated group of purchasers, all who wish to purchase the same product or service at step 150. In this case, the system allows for the group to submit offers adhering to the original terms and conditions presented by the manufacturer, or alternatively presenting an alternative counter offer with terms and conditions to purchase the product or service for each member of the group, potentially receiving a significant bulk discount on each item, and perhaps other preferable terms such as reduced shipping rates, preferred warranties, or other benefits. The manufacturer will preferably then be able to accept or reject each counter offer as appropriate. The method and system for presenting and accepting such offers also maintains the secrecy of user information according to the requirements of the user, until it is necessary to disclose this information to complete a transaction.

Once the manufacturer receives and accepts one or more offers at step 160, the users are provided the goods or services at step 170 according to the finally agreed upon terms and conditions. In such a manner, rather than manufacturers producing their goods and services and selling to wholesalers or stores in advance of understanding the demand for a product, by allowing for a supply-driven availability to be presented to potential buyers very early in a manufacturing timeline, and by allowing and a user-generated counter offer to be provided to the manufacturer if the user wishes to change the terms on which the manufacturer has originally offered goods or services, and therefore allowing for direct contact between the two, many friction points in a standard sale of goods process are removed, allowing the manufacturers to produce just in time goods, and for users to benefit from the cost savings enjoyed by the manufacturers' mitigation of the Bull-whip effect, effectively functioning in a system where Demand drives changes in Supply rather than Supply being fixed and sales and pricing being subject to the fickle level of Demand.

The process described above, and as will be described in greater detail below, presents a virtual universal Enterprise Resource Planning (ERP) system between consumers, manufacturers and third party logistics suppliers, thus resulting in more efficient procurement by consumers, and more efficient supply by the manufacturers and the third party logistics suppliers, therefore reducing uncertainty, overall cost, and providing a more favorable outcome to all parties involved, effectively providing a near-perfect system in the pursuit of Who, What, Where and When.

Figure 2:
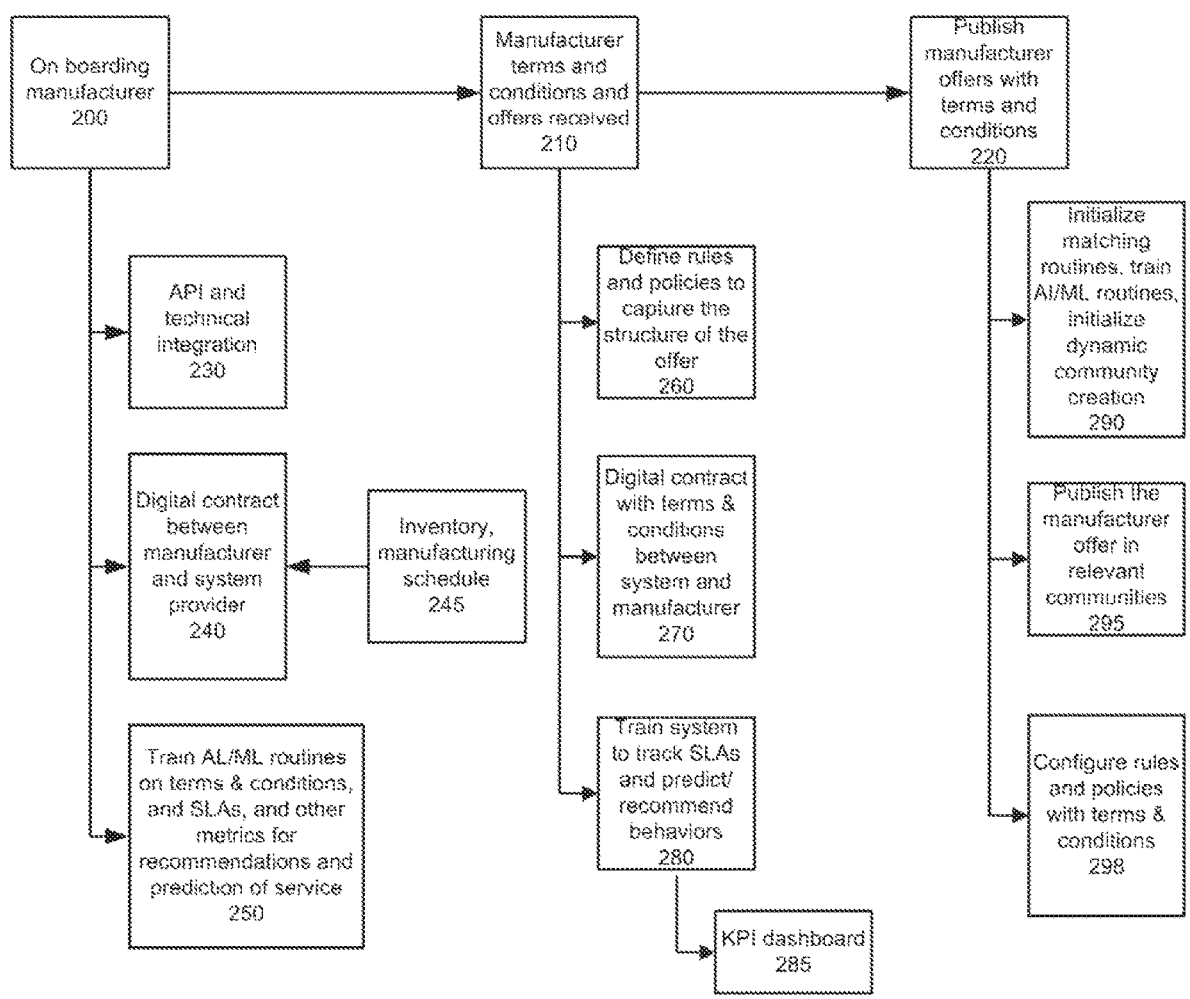
FIG. 2 is a flowchart diagram depicting a process for onboarding manufacturers.
Figure 3:
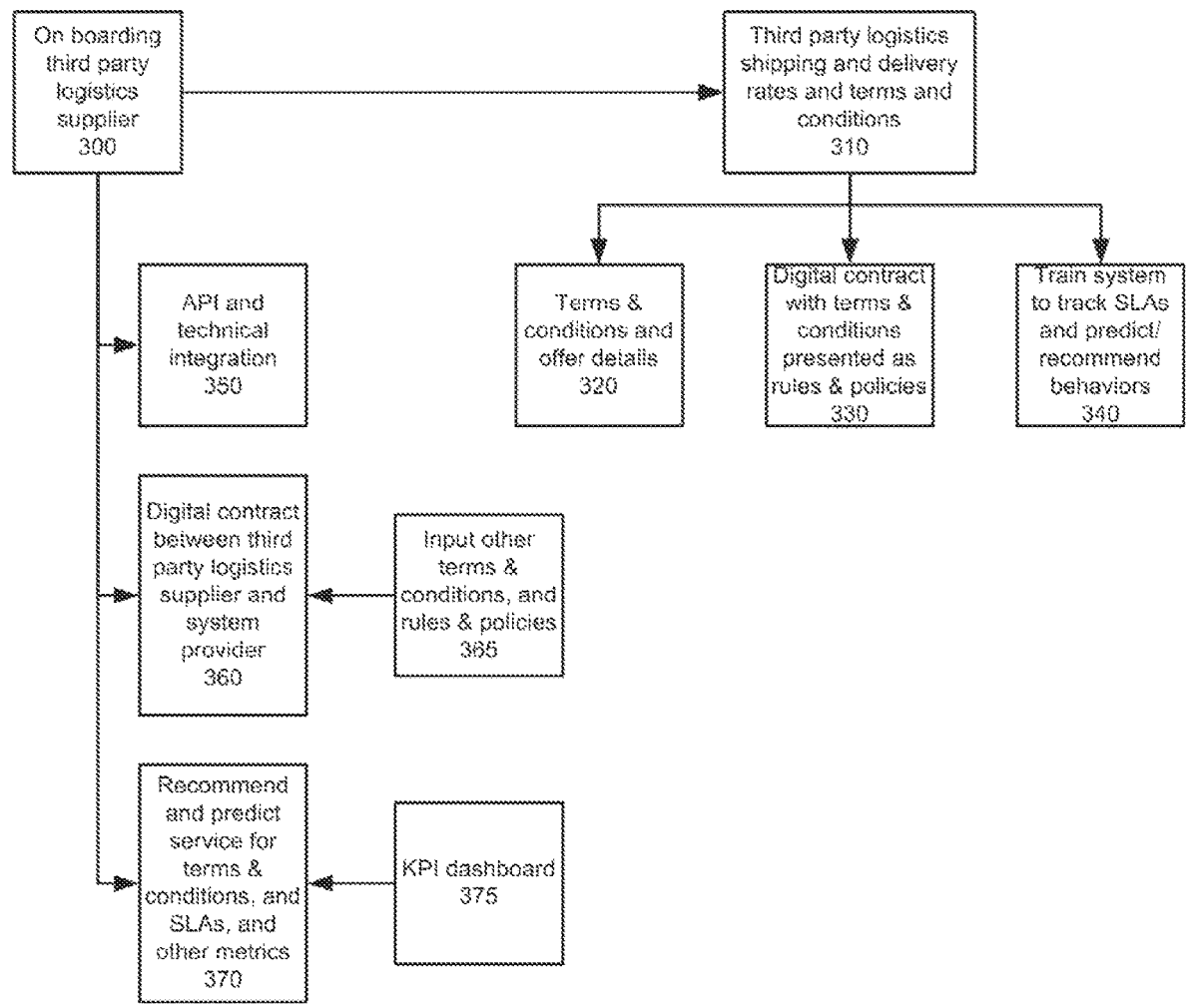
FIG. 3 is a flowchart diagram depicting a process for onboarding third party logistics providers.

As noted, step 100 of FIG. 1 includes the process for onboarding manufacturers and third party logistics providers. These processes will now be described in greater detail making reference to FIGS. 2 and 3. As is first shown in FIG. 2, a manufacturer is onboarded starting at step 200. The Platform onboards each manufacturer including providing an application programming interface ("API"), plugin, or other means of technical integration between the disclosed system and the manufacturer's manufacturing resource planning (MRP) system and other information at step 230. The system also may create a digital contract at step 240 between the manufacturer and the system with default terms & conditions and rules & policies for all interactions between the parties (the system and the manufacturer, and also the manufacturer and any potential future purchasers) and purchases by each user. Manufacturer inventory and manufacturing schedule may also be input into the digital contract generation at step 245. At step 250 the system may also initiate and train its AI/ML routines on the manufacturer's terms & conditions, SLAs and other metrics for recommendation and prediction of service, and similarly will learn user behavior, system utilization, and other aspects of transactions so that it may provide insight and suggestions that assist in completing and closing deals between manufacturers and consumers or consumers and manufacturers. In other terms, AI/ML routines will track and learn in a dynamic fashion all interactions between the system, system end users ("Community") and any other behavior to rationalize, predict and procure at the most optimal terms and conditions for the Community for present and future deals. The system of the disclosure effectively provides a universal Enterprise Resource Planning (ERP) system between the consumer, manufacturer, and third party logistics providers.

As part of this process, processing then continues at step 210 where manufacturer terms and conditions are provided and the offers of goods potentially to be provided are received by the system. Thus, a manufacturer makes offers to put products on to the system (preferably for the sale of goods and services more than approximately 30 days in the future, but any time frame may be utilized that allows for the manufacture to enjoy a benefit from understanding consumer demand in advance of manufacturing the goods) with offered terms and conditions to be presented from the manufacturer to potential purchasers which the system has approved (preferably as an fiduciary agent of the eventual purchasers).

The system preferably will define the rules & policies to capture the complete terms and structure of the agreed offer at step 260 and formulate a Digital Contract between the manufacturer and the system governing the execution of the agreed offer between the parties and purchases by user/partners at step 270. At step 280 the system may initiate learning of the AI/ML routines defined in step 250 to capture trends, adoption, satisfaction, etc. for the specific offers and history of transaction performance for each deal with the manufacturer and Community participation resulting in the establishment of a KPI dashboard of past and present performance per manufacturer and its offerings at step 285.

During the onboarding process, the system undertakes and completes all negotiations with manufacturers regarding all terms and conditions that are satisfactory to the system that are to be presented to end users/Community when goods or services are to be purchased from the particular manufacturer. Thus, the system will define the rules & policies to capture the complete terms and structure of any eventually agreed upon and formulate a digital contract between the manufacturer and the system governing the execution of the agreed offer between the parties and purchases by any user in the Community. The system will similarly ingest data to accomplish learning of the AI/ML routines noted above to capture trends, adoption, satisfaction, etc. for the specific offers and history of transaction performance for each deal with the manufacturer and Community participation resulting in the establishment of a KPI dashboard of past and present performance per manufacturer and its offerings, and allowing for the system to in the future make suggestions or changes to terms and conditions that may assist in completing deals between manufacturers and consumers.

Once the manufacturer is onboarded and all terms and conditions to be included in any proposed future sale are agreed upon, processing passes to step 220 where one or more offers and associated terms and conditions for the onboarded manufacturer are preferably published to one or more communities generated in accordance with the use of the system, and are then available to be included in the results provided in response to any search performed by a user. For each offering, at step 290 the system will preferably initialize its matching routines to enable a multi-factor marketing sequence, including one or more universal search capabilities and preferably based upon AL/ML routines so that the system is able to purchase goods and services on behalf of the consumer, rather than distributing goods and services on behalf of the manufacturer as a distributor. The multi-factor marketing sequence process captures all of the specifications, functionalities and attributes of each SKU and product to be offered by the manufacturer. A proprietary algorithm associated with the system is preferably used to find and determine matches of users wants, needs & desires to the product ("Expert Advisor"), the Product specifications, functionalities and attributes are quantified and matched to the potential wants, needs and desires our Community partners want to satisfy, in other words, a best match for a user's needs is found from among the available products, or from outside products available in the system.

The system at step 290 will also initiate training of AI/ML routines to capture all other terms & conditions, rules, policies, specifications, and any other data for the Product/SKU/offer and manufacturer that was not previously captured in during the onboarding process. The system will also initialize dynamic community creation for the specific capabilities, attributes, functionalities and specifications that satisfy the specific community's wants, needs and desires associated with this specific product and offer. Once such communities and their wants, needs and desires are understood, they can be matched with manufacturers provided key product information and their attributes and functionalities to determine a best match. This process will be described below in greater detail. Thereafter, at step 295 the manufacturer offer is preferably published in one or more relevant communities, and at step 298 terms & conditions are configured to align with provided rules and policies of the published offer.

In addition to onboarding manufacturers at step 100, third party logistics providers are also preferably onboarded. This process is described in greater detail in FIG. 3. As is shown, the third party logistics provider is onboarded at step 300, where the onboarding process proceeds in two areas. First, at step 310 standard shipping and delivery rates and other terms and conditions are agreed upon by the third party logistics supplier and the system. This step further includes agreeing to standard terms and conditions and offer details to be presented to a future purchaser at step 320. While the standard terms are initially agreed upon, these terms may be negotiated at the time of the offer presentation based upon volume, timing, or other circumstances unique to the particular offer being made. Thus, an auction system may negotiate final shipping and delivery terms and conditions with third party logistics providers, based upon originally agreed upon base rates, but potentially adjusted in individual situations based on the specifications of the digital contract between the third party logistics provider and the user/partner. Users/partners are preferably notified of any changes to the terms & conditions of shipping offers (e.g. final shipping costs, if lower than discounted standard rates established in step 320. The onboarding process also continues by generating a digital contract between the system and the third party logistics provider including these base shipping rates and terms and conditions presented as rules and policies at step 330. For example, the system preferably negotiates discounted standard base rates when using the third party logistics provider to every zip code in the country. This is beneficial to the third party logistics provider as it is expected that the shipments may be scheduled far in advance or in bulk, allowing the third party logistics supplier to efficiently schedule and ship the goods. The system finally may initiate tracking analysis and AI/ML routines to track SLAs, performance, utilization, service, feedback and other metrics for recommendation and prediction of service at step 340.

While these contracting elements are being completed, the system also further technically onboards each third party logistics provider onto the system by collecting system derived or user entered pertinent data and metadata including: company profile, rate information, payment information, terms & conditions and additional information. The system also initiates API and technical integration between the Platform and third party logistics supplier's systems at step 350, including making available one or more of the following: a rate management API, a shipment management API, a shipment consolidation management API, a location services API, and other applicable APIs.

The system creates a Digital Contract between the third party logistics providers and the system provider at step 360 with default Terms & Conditions, Rules & Policies and any other non-default terms & conditions for all interactions between the parties and shipping of purchases by user/partners, preferably based on the digital contract between the third party logistics providers and the system entered into at step 330, which are provided at step 365. At step 370, the system may also initiate its AI/ML routines on the third party logistics provider's terms & conditions, SLAs, performance and other metrics for recommendation and prediction of service and history of performance for the third party logistics provider and Community participants resulting in the establishment of a KPI dashboard of past and present performance per third party logistics providers at step 375.

Figure 4:
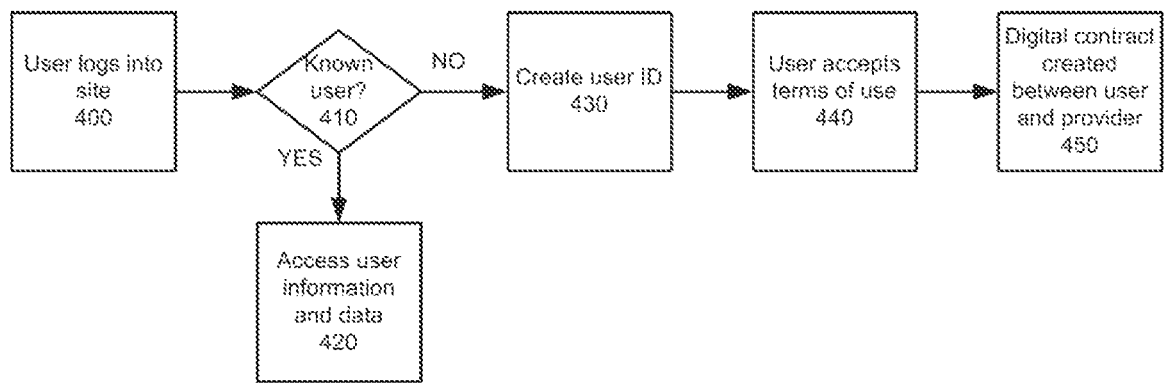

After onboarding of any desired manufacturers or third party logistics providers (of course, new entities may be added to the system at any time), processing then continues to step 110 in FIG. 1, the details of which will now be described in greater detail referring to FIGS. 4-7. Referring first to FIG. 4, a user preferably logs onto a particular system site at step 400, which may comprise a mobile, web, application, mobile device app, or any other commonly used system access point. Next, it is queried whether the user is a known user at step 410. If it is determined that the inquiry at step 410 is answered in the affirmative, and it is therefore confirmed that the user in a know user, processing continues at step 420 where the anonymous and known user information and data are accessed by the system based on the terms & conditions of the digital contracts between the system and the user.

If on the other hand the inquiry at step 410 is answered in the negative, and it is therefore determined that the user is not a known user, processing continues where a user ID is preferably created at step 430, the new user accepts terms and conditions of the system site at step 440, and a digital contract is generated between the new user and the system provider covering the terms of the user's relationship with the system. A unique hashed random anonymized UserID that may be kept anonymous by continuously changing the hash over time is preferably created for the user (step 430) and, upon acceptance of the system's general terms & conditions of use (step 440), the system generates the digital contract between the user and the system to capture acceptance of the system's terms and conditions that govern anonymity terms & conditions, rules & policies and other terms & conditions which defines the data structures of the agreement between the system and the user with default settings.

Figure 5:
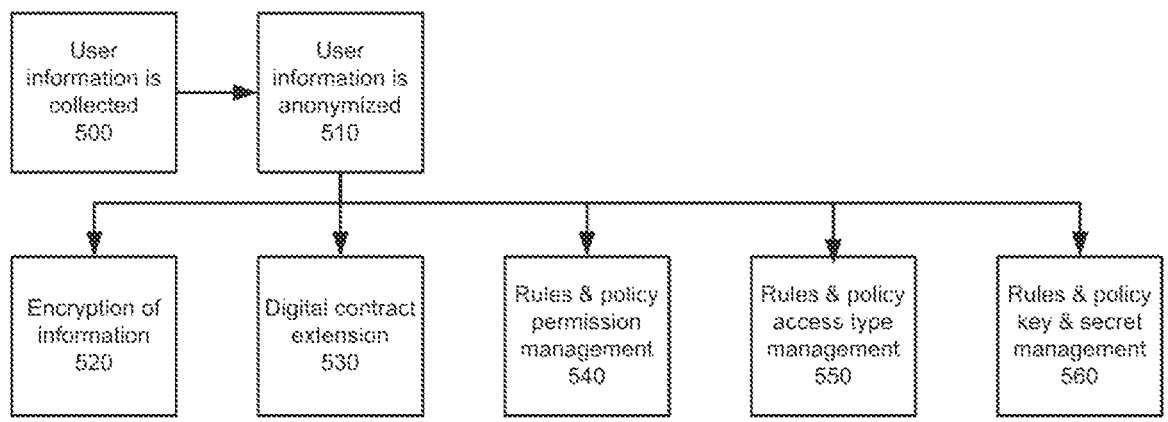
FIG. 5 is a flowchart diagram depicting a process in which user information is preferably anonymized.

After the user is verified or created, processing then passes to the steps shown in FIG. 5, in which the user information is preferably anonymized. Each unique user wishing to access the system may be required to disclose their email address and geographic location for internal system purposes only. The user/partner information may be utilized to provide notifications from the system (manufacturers, administrators, etc.) to the user. Additional information may also be entered by the user or derived by the system over time based on user's interaction with the system including: UserID, Name, Profile Details, shipping details, billing address, payment details, demographic info, shopping preferences, etc.

All of this collected additional user profile information is preferably anonymized to protect user information and is encrypted using a standard encryption process at step 520. The personal digital contract between the Community user and the system is extended to cover any additional user information provided to the system that was not originally anticipated during initial contract generation at step 530. Furthermore, users select their rules and policies in reference to permissions (step 540) and access types (step 550) for how, what, and where any of their personal anonymized data can be used for user/partner economic benefit (savings on their purchases from manufacturers, for example). This one element that enables implementation of the disclosed system. It is the user that is able to determine which of their personal information is provided to any third parties, and when it is to be provided and for what renumeration the user can attain for their personal information. As noted below, the ability to remain anonymous until one wishes to enter into a transaction, but still allowing for historical information to be used to aid in recommending products, is an element that is provided by the disclosed system. The system will also assign each user a public and private key as part of a proprietary key & secret management cryptography system, including a rotating hash system, at step 560.

Figure 6:
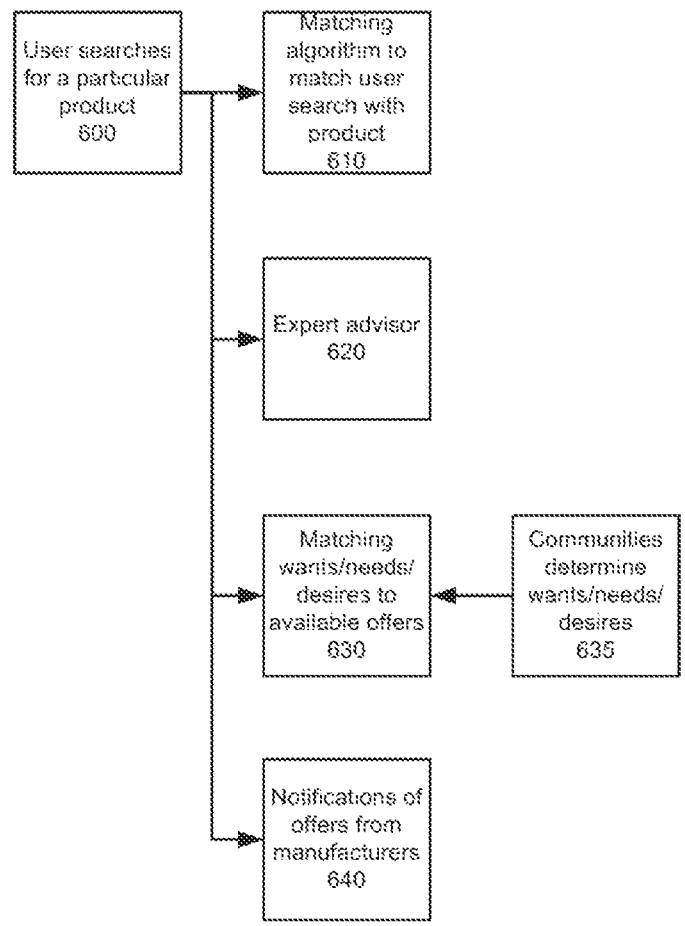
FIG. 6 is a flowchart diagram depicting a process where a user searches for a particular product or service.

Processing then continues with the steps shown in FIG. 6, where the user searches for a particular product or service starting at step 600. When a user searches for a particular product or product category, preferably, an AI-engine matches the search to all manufacturers, options, offers and by metadata information of specifications, attributes and functionalities of the particular product or product category at step 610. In other words, users can search for a product or product category by any one or multiple data points for that product or product category. This search preferably may include multi-factorial search techniques in addition to traditional eCommerce searching techniques—and thus taking into account product specifications, attributes, functionalities of such attributes, similar utilization of particular products based on the use by dynamic communities to which a particular user may have been assigned, unbiased professional feedback, demographics related preferences, and the like. From the expressed user/partner search for a particular product or product category (or an "Expert Advisor's" pick (step 620) as will be described below), the system may determine associated products and product categories that may be applicable to that unique user at step 630. This is the basis of and proliferation of communities of common wants, needs and desires at step 635, where communities users with similar wants/needs/desires (perhaps they are at the same life event, such as having a baby) are grouped together and provided product and service suggestions based upon their participation in one or more of such communities. In other words, the user may be dynamically attached to one or more communities. Based on the multiple factors, such as want, needs & desires; demographics, locations, previous and recent searches/procurements and predictions based on AI routines to predict the needs of the users, the users are dynamically attached to one or more communities. These communities change based on the real time and past behaviours, actions, and other criterias of the user, users in the dynamic communities, manufacturer offers and products in the catalogue. This enables the platform to predict and recommend products based on data and not marketing campaigns. This allows for the use of product specifications, extrapolation of wants, needs and desires of communities that may not yet have used or indicated a desire for a particular product, quality control inputs, and the like.

As noted, the system preferably provides multiple methods of product and offer search for user/partners:

The user/partner has the opportunity to use a new proprietary feature called "Expert Advisor" (step 620) which includes algorithms associating the features, attributes and functionalities of each SKU based on its specifications (and the functionality of those specifications), reviews (from unbiased sources), quality analysis (from various QC offerings), utilization (based on the dynamic communities and similar wants, needs & desires), demographics (popularity and trends based on demographics), location (based on when the product is required), logistics costs (based on shipping) etc to best match and gratify their individual wants, needs and desires to their highest degree. The "Expert Advisor" is preferably a multi-factorial search and matching algorithm that takes users behavior, demographics, similar communities, product specifications, independent reviews, etc to match the right product for the right user. The system is preferably brand agnostic and recommends goods only based on the AI driven probability & recommendation algorithm of the products' execution capabilities to satisfy the unique particular (highest degree of personalization) wants, needs and desires of that individual user/partner's requirements.

From the AI/ML applications of creating dynamic master communities of common wants, needs and desires and sub-communities of personalized attributes of these common wants, needs and desires, the system can preferably recommend offerings that exist on the System that may help satisfy or that the user/partner may have a desire to be aware of offerings that are applicable to the user/partner's positioning of the master community or sub-community in which they have status. The System's AI/ML routine dynamically recommends offers to user/partners based on their communities of similar wants, needs and desires at step 630 and the user/partner receives a notification on product offerings that are associated with the common wants, needs and desires of the master community and/or personalized sub-communities (step 635) that the individual user/partner has been associated with dynamically (in both anonymized or identifiable fashion depending on the permission to share information agreed upon by the user) by the AI/ML matching system from one or more manufacturers at step 640.

For both community or master community common wants, needs and desires, the system preferably aggregates the potential and/or actual level of interest for a particular product or product category (what, when, where, how) of the unique users' potential and/or actual interest. All user/partner system behavior is captured, whether it is new or repetitive, to enhance understanding of user dynamic community behavior and intent.

Figure 17:
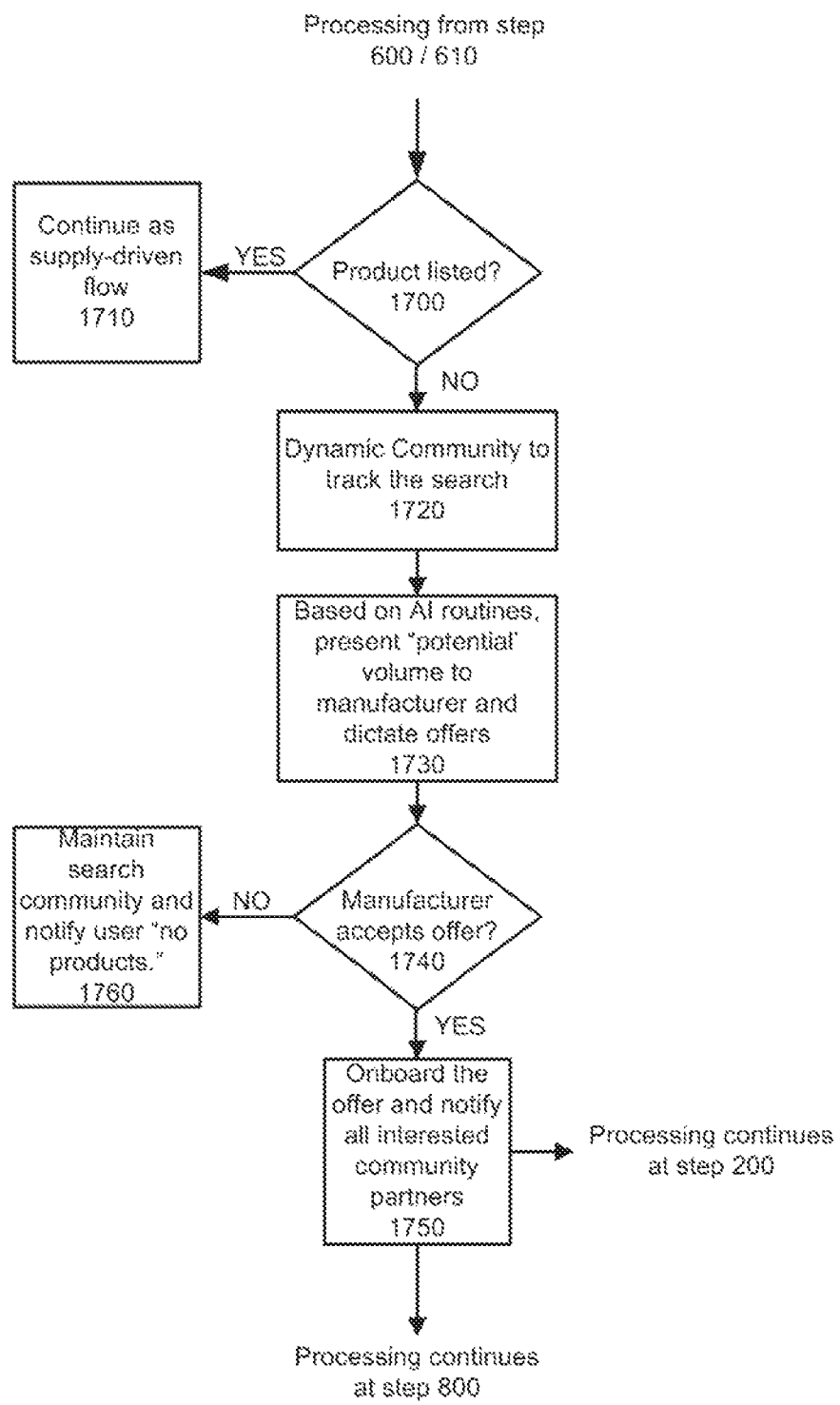
FIG. 17 is a flowchart diagram depicting a process defining generation of a demand-driven offer.

In accordance with an alternative embodiment, in response to the user search at step 600 and the associated matching algorithm at step 610, it may be desirable to insert a routine such as that shown at FIG. 17, defining a demand-driven offer, where users may request a product that is in fact not yet offered as an existing offer by a manufacturer in the system. Thus, as is shown in FIG. 17, at step 1700 it is queried whether a product for which a search has been conducted is available in the system. If the query is answered in the affirmative, and therefore it is confirmed that the requested product is available in the system, processing continues at step 1710 through the supply-driven processing restarting with step 630 of FIG. 6. If on the other hand, the inquiry at step 1700 is answered in the negative, and it is therefore determined that the product for which a search has been conducted is not available in the system, processing proceeds with step 720 where the requested product is paired with a dynamic community in one of two ways, as will be further described making reference to FIG. 18.

Figure 18:
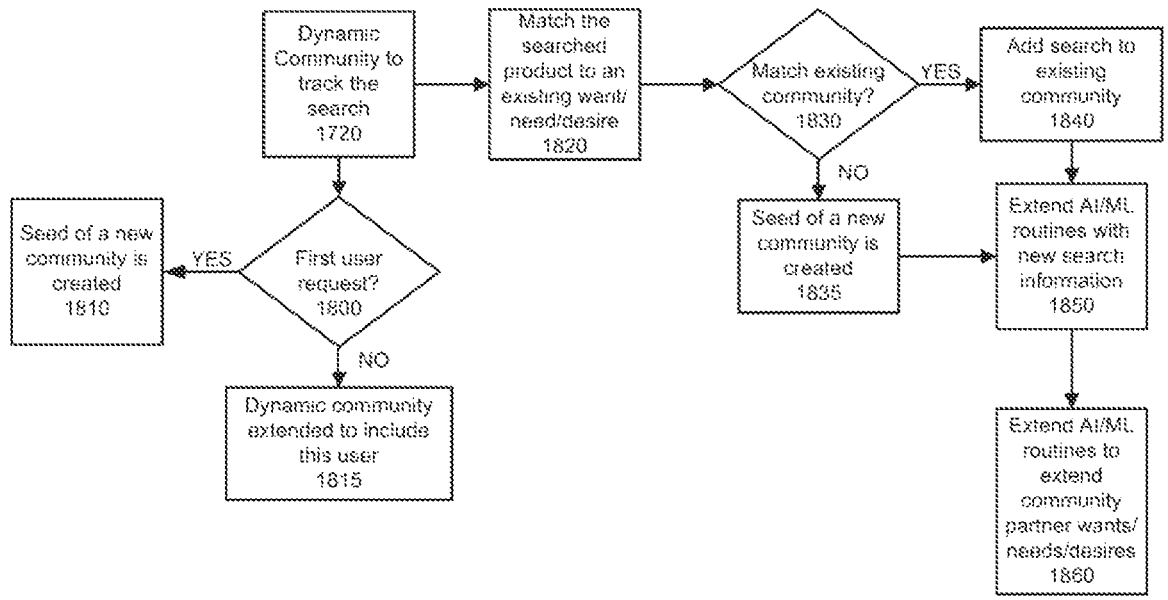
FIG. 18 is a flowchart diagram depicting pairing a requested product with a dynamic community.

As is shown in FIG. 18, it is first queried at step 1800 whether the request at step 1720 is the first time a user has made such a request. If the inquiry at step 1800 is answered in the affirmative, and it is therefore determined that this is the first user to make such a request, processing continues at step 1810 where the seed of a new community is created. If on the other hand the inquiry at step 1800 is answered in the negative and it is therefore determined that this is not the first user to make a request for this product, then the existing dynamic community to which one or more users who previously made this request is expanded to include the new user. In parallel, processing also continues from step 1720 to step 1820 where the searched product is preferably matched to one or more existing wants/needs/desires. Thus, at step 1830 it is further queried whether the existing want/need/desire matches those of an existing community If the inquiry at step 1830 is answered in the affirmative, ands it is therefore determined that the want/need/desire is associated with an existing community, the search is added to that existing community at step 1840. If on the other hand the inquiry at step 1830 is answered in the negative, and it is therefore determined that the want/need/desire does not match those of an existing community, a seed of a new community is created at step 1835. The system dynamically attaches the new community to a Master Community for similar wants, needs and desires. Processing then returns to step 1730 in FIG. 17.

Thus, at step 1730 the system preferably employs one or more artificial intelligence/machine learning (AI/ML) routines to estimate a potential demand for the particular searched product (including volume and desired/proposed terms) to be provided to the manufacturer to aid in determining whether the manufacturer is willing to supply or manufacture the product, and under what conditions. An inquiry is then made at step 1740 as to whether the manufacturer accepts the offer to provide the product. If the manufacturer does not accept 100% of the terms & conditions of the offer from the community made at step 1730, the system preferably negotiates amended terms and conditions with the manufacturer on behalf of the community of users that are satisfactory to the users, as determined by the supporters of the system. If the manufacturer then accepts the offer, and therefore the inquiry at step 1740 is answered in the affirmative, processing proceeds with step 1750 where the interested community partners are notified of the acceptance, and processing continues at steps 200 (to add the manufacturer offer to the system, to publish the offer in the system for future users, and, to notify one or more existing dynamic communities that one or more existing and as yet potentially unfulfilled wants/needs/desires are met by this new offer) and 800 to continue further processing to properly complete the transaction.

If the inquiry at step 1740 is answered in the negative, and the manufacturer does not accept the offer, processing proceeds at step 1760 where the communities are maintained (i.e. no changes), and the user is notified that there are no available products.

Figure 7:
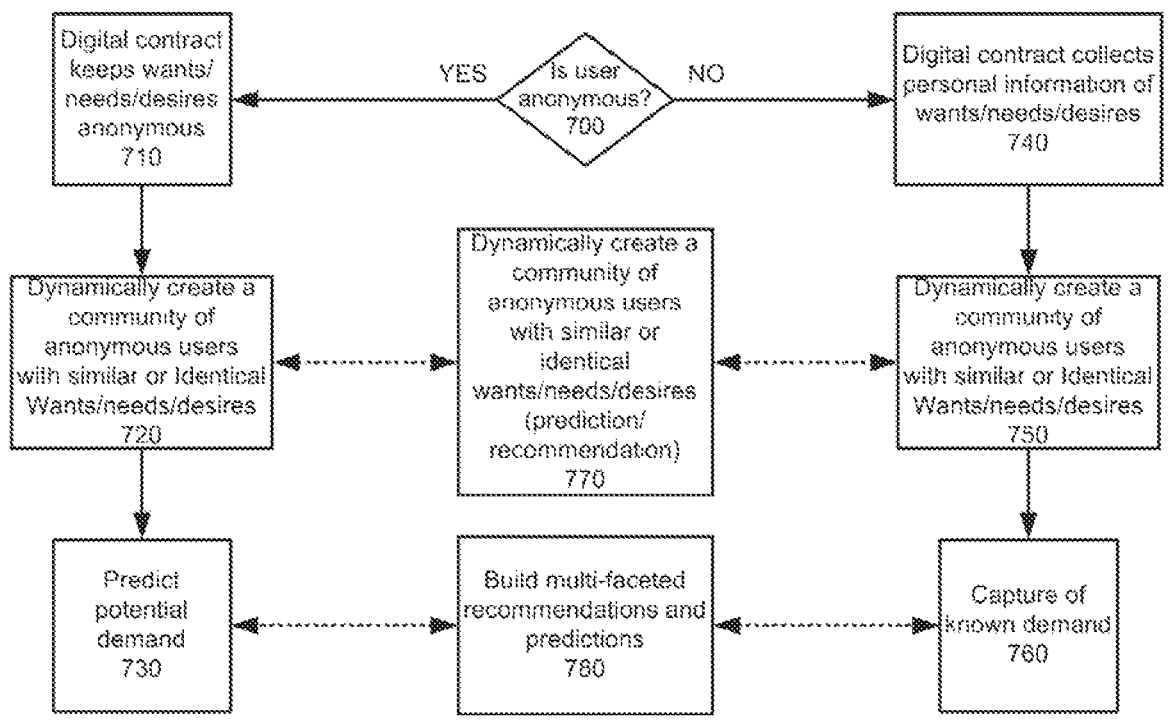
FIG. 7 is a flowchart diagram depicting a process for keeping or not keeping all user personal information and system behavior anonymous to all outside parties other than the system provider.

Reference will now be made to FIG. 7, where the method for keeping all user personal information and system behavior anonymous to all outside parties other than the system provider (step 710) or shares relevant personal information with system participants based on user customized privacy permission step 740, while dynamically grouping and regrouping users based upon their behavior, their wants, needs, and desires, and the same of others. Thus, at step 700 it is queried whether the user is anonymous. If this inquiry at step 700 is answered in the affirmative and it is therefore determined that the user is anonymous, processing passes to step 710 (noted above) for anonymous processing. If on the other hand the query at step 700 is answered in the negative and it is determined that the user is not anonymous, processing passes to step 740 (noted above) for processing including personally identifiable information.

From the search of a particular product or product category, the Platform dynamically creates Communities of anonymous users at step 720 and communities of known users at step 750 with similar or identical wants, needs and desires and dynamically attaches the anonymous and known Communities to a Master Community associated with other wants, needs and at step 770. The system preferably uses communities of anonymous users defined in step 720 to dynamically predict potential demand at step 730 among the anonymous users, and uses communities of known users defined in step 750 to dynamically predict potential demand at step 760 among the known users. The Platform's proprietary AI/ML routine preferably extends Gaming Theory, Bayes Theorem and Deep Belief Networks to build multifaceted recommendations and predictions at step 780 based on the master community and predictions of potential and known demand.

Figure 19:
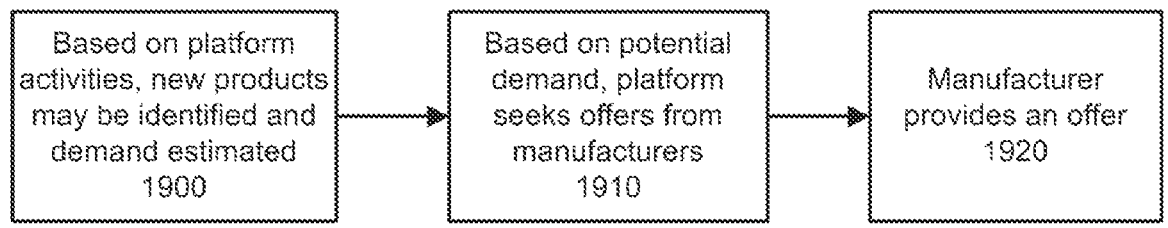
FIG. 19 is a flowchart diagram depicting an automated processing system for identifying one or more new products not currently listed on the system that may satisfy the wants/needs/desires of one or more system communities.

In a further alternative embodiment, once the system has been set up, various manufacturers and third party logistics providers have been onboarded, and various user and communities have engaged in using the system, it has been determined that the system need not wait for one or more users to search for a particular product to enjoy the benefits of the system. Therefore, as is shown in FIG. 19, at step 1900 an automated processing system may identify one or more new products not currently listed on the system that may satisfy the wants/needs/desires of one or more system communities. Demand for such a product may also be estimated, and based on this information the platform may seek offers from one or more manufacturers to provide the identified goods. If acceptable to a manufacturer, that manufacturer may make an offer to the platform, at which point the offer is onboarded at step 210, and proper notifications are made to relevant communities at step 220.

The Platform's AI/ML routines predict potential demand for the new product not currently listed on the system.

Referring back to FIG. 1, details associated with the user confirming terms for purchase at step 140, provision of a purchase offer based upon aggregated Community demand at step 150 will now be described in greater detail making reference to FIGS. 8-12.

Figure 8:
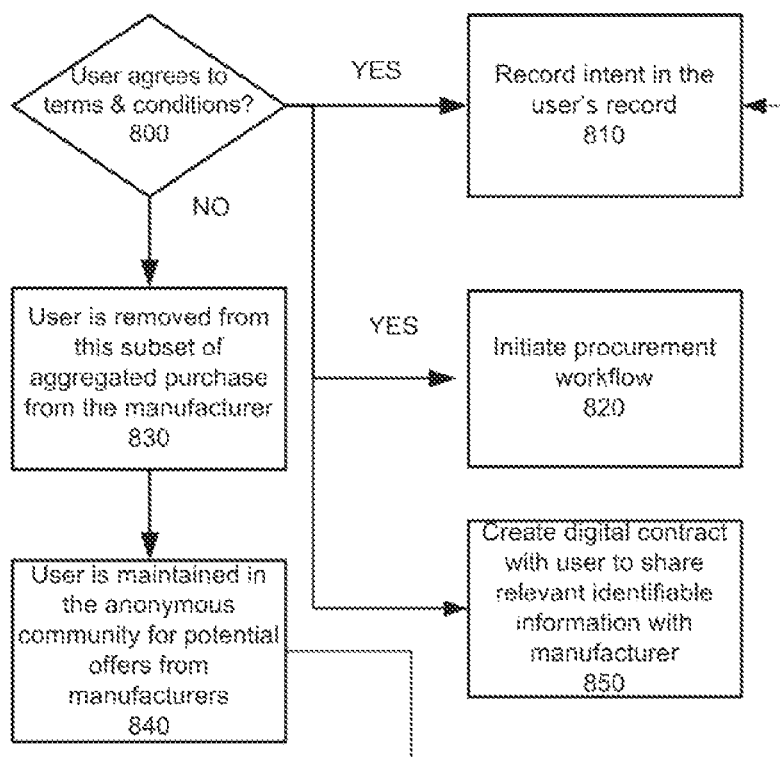
FIG. 8 is a flowchart diagram depicting a process where the user and provider agree to all terms and conditions for a particular product offer.

As is first shown in FIG. 8, after finding a desirable product in FIG. 7, it is queried whether the user agrees to all terms and conditions for a particular product offer at step 800. If the inquiry at step 800 is answered in the affirmative, and it is therefore determined that the user in fact agrees to the terms and conditions set forth in the product offering, processing passes to step 810 where the intent of the user to accept the terms and conditions is recorded in the user's record, to step 850 where a digital contract is created between the system and the user to allow the system to share relevant identifiable user information with the manufacturer, based upon the user's previously provided permissions to the system. All users that execute the contract must agree that any relevant information necessary for the manufacturer to actuate the sale and for the third party logistics provider to deliver the product can no longer be anonymous as to the associated manufacturer and third party logistics providers. This process is further shown in FIG. 10 where such a contract is generated at step 1000.

The system creates a digital contract with the user/partner to share relevant information with associated manufacturers and third party logistics providers, including payment, billing and shipping information (see step 1040). The transaction also trains the system's AI/ML routine to learn user behavior and dynamic functionality at step 1010, to learn wants, needs, and desires of the system users at step 1020, and to also learn manufacturer and product adoption trends at step 1030. The system also writes the rules & policies that govern this transaction between the Community user/partner and manufacturer for this transaction at step 1040.

Returning to FIG. 8, processing also continues at step 820 where a procurement workflow (including interacting with the manufacturer and placing the orders on behalf of the users/communities by the system) is initiated (including putting the product in a cart, selecting among one or more delivery options, providing payment information, shipping information, etc.) for purchase of such product with via the system form the noted manufacturer and employing a particular designated third party logistics provider. The user/partner then purchases the product.

If on the other hand the inquiry at step 800 is answered in the negative and it is determined that the user does not agree to the terms and conditions set forth in the product offering, then processing passes instead to step 830 where the user is removed from this aggregated purchase arrangement with this particular manufacturer for this particular product offering, and in turn to step 840 where the user is still maintained in the anonymous community to still receive other potential offers from relevant manufacturers. Finally, the intent of the user to not accept the terms and conditions of the product offering is recorded in the user's record. This information may be further shared with the manufacturer that the presented terms were not acceptable by x number of anonymized and y number of known users, thus providing insight to the manufacturer that can be incorporated to a future potential offer.

Figure 9:
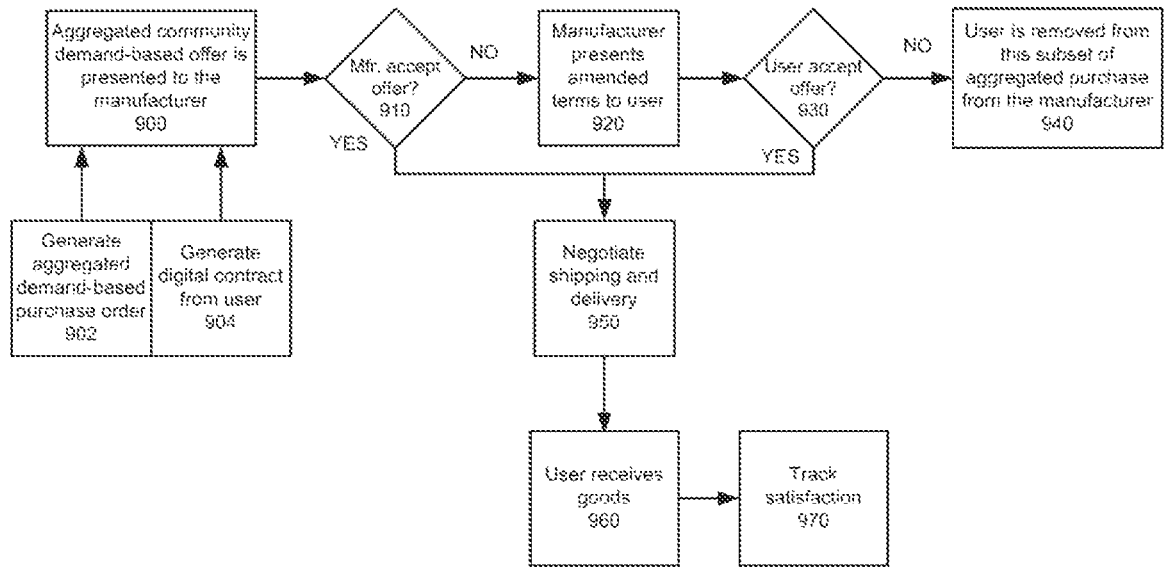
FIG. 9 is a flowchart diagram depicting a process for presenting an aggregated community demand-based offer to the manufacturer as a counter offer.
Figure 10:
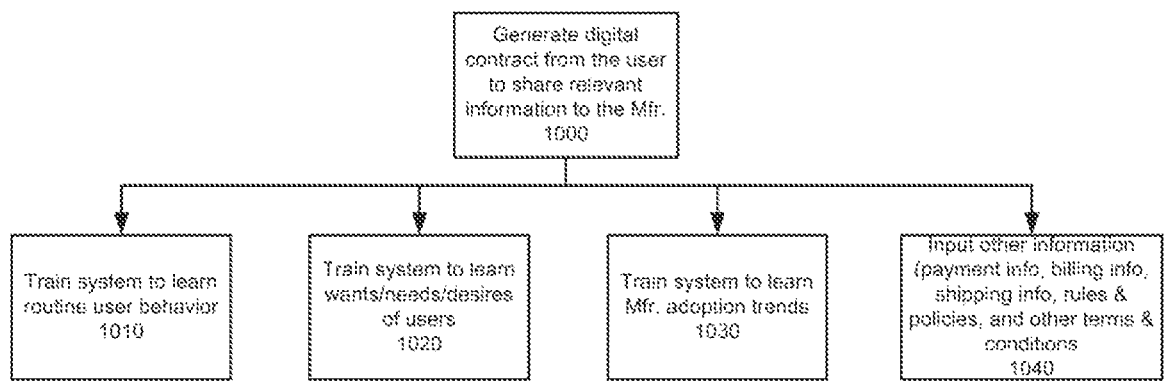
FIG. 10 is a flowchart diagram depicting a process for generating a contact and processing other elements in response to such contract.
Figure 11:
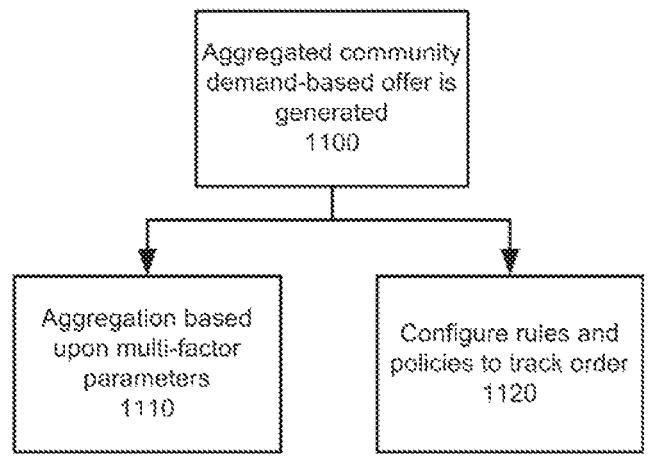
FIG. 11 is a flowchart diagram depicting a process for providing aggregated demand to the manufacturer.

Processing then passes to FIG. 9 where at step 900 an aggregated community demand-based offer may be presented to the manufacturer as a counter offer for acceptance or rejection by the manufacturer, and as described below, the system receives electronic confirmation of acceptance or rejection of some or all of the purchase orders presented by the users. This offer may be for the purchase of goods from a number of users constituting a Community on the system who each may have slightly different terms and conditions, so that the manufacturer may accept all, some, or none of the purchase orders. The total aggregated demand for a particular product with a particular manufacturer or manufacturers with all the terms and conditions of the offer or offers are proffered to the particular manufacturer or manufacturers. As is further shown in FIG. 11, the system provides aggregation of demand to the manufacturer at step 1100 based on multiple parameters at step 1110 and configures the rules & policies to track the order for all user/partners that accepted all of the terms of the order and executed the purchase at step 1120.

Figure 13:
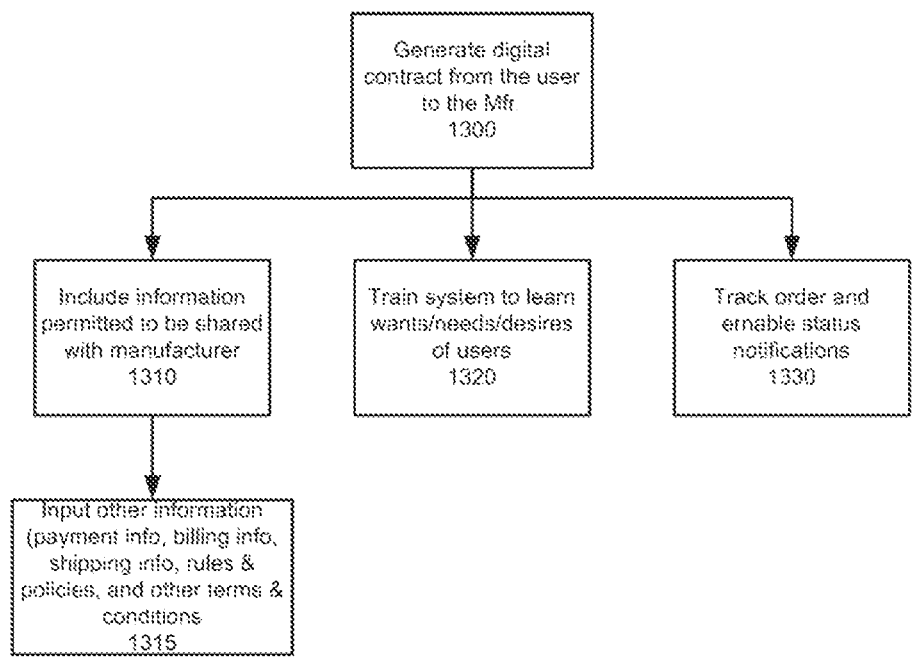
FIG. 13 is a flowchart diagram depicting a process where the contract is further used to track an order, any updates, and compliance with any requirements of delivery.

Referring back to FIG. 9, the offer in step 900 is therefore generated based upon an aggregated demand-based purchase order (step 902) and a digital contract generated from the user to be provided to the manufacturer at step 904, and as is further shown in FIG. 13 starting at step 1300, the contract being further used to track the order, any updates, and compliance with any requirements of the delivery. At step 1310 the system shares relevant information (such as that shown at step 1315) with the manufacturer and other parties based on the digital contract between the user and the system to share relevant information (as captured by the rules & policies) from step 1000 shown in FIG. 10. At step 1320 the system also trains its AI/ML routines to learn wants, needs and desires of users established in step 1020 and initiates routines to track orders and enable status notifications, etc. at step 1330.

Figure 12:
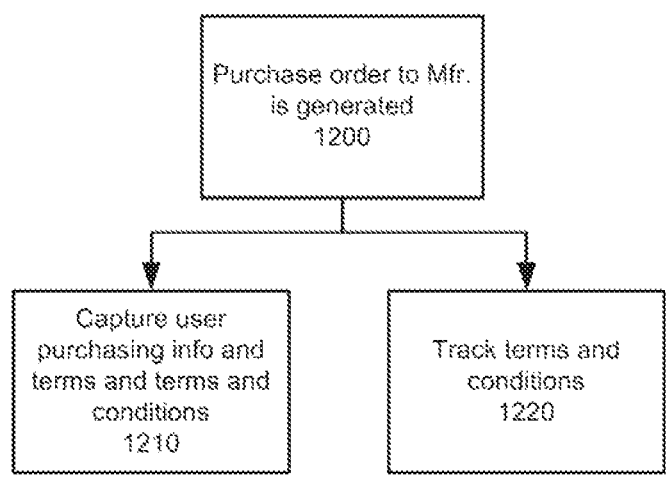
FIG. 12 is a flowchart diagram depicting a process for generating a purchase order.

The process for generating the purchase order is further described in FIG. 12, starting at step 1200. This purchase order includes the contractual terms and conditions between the user and manufacturer for purchase of the product. The user purchasing information and terms and conditions are captured into the purchasing order at step 1210, and terms and conditions related to the purchasing order are tracked at step 1220.

Once again referring back to FIG. 9, after the offer is presented to the manufacturer, processing passes to step 910 where it is queried whether the manufacturer has accepted the offer. If the inquiry at step 910 is answered in the negative, and it is therefore determined that the manufacturer has not accepted the offer, processing passes to step 920 where the manufacturer may present amended terms to the offer back to the user. If manufacturer does not accept 100% of the purchase orders (e.g. the manufacturer cannot or chooses not to satisfy the aggregate demand of the community or the aggregate demand of the community exceeds the terms and conditions of the Offer), the system preferably negotiates amended terms and conditions with manufacturer for the unaccepted purchase orders, if possible. If not possible, processing returns to step 800 above.

Figure 14:
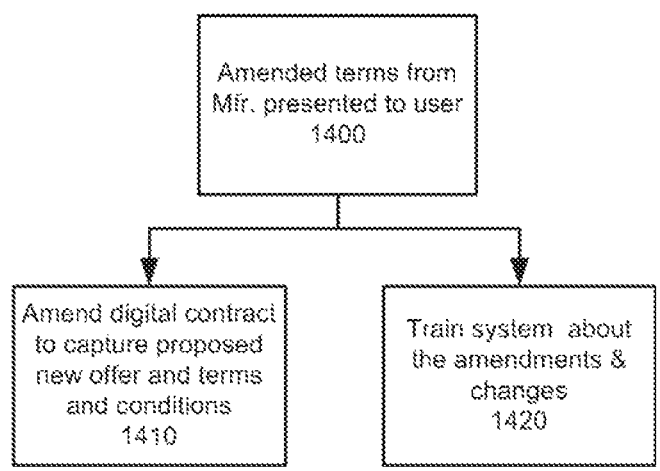
FIG. 14 is a flowchart diagram depicting a process where negotiated amended terms and conditions are presented to users with unexecuted purchase orders.

The negotiated amended terms and conditions (if possible) are presented to the users with unexecuted purchase orders as is shown in step 1400, making reference to FIG. 14. If such a counter offer is made, processing passes to step 930 where it is queried whether the user accepts the counter offer. If this inquiry at step 930 is answered again in the negative and it is determined that the user does not accept the offer, then the user is removed from the aggregated purchase from the manufacturer.

If the user wants to execute on these amended terms and conditions as described below, at step 950, a new purchase order will be executed via the system between the user and the manufacturer to capture the proposed new offer and terms and conditions. The system therefor amends the digital contract between the user/partner and manufacturer from step 1300 with the new terms and conditions at step 1410 and trains its dynamic AI/ML routines about the amendments and changes as input for future processes to minimize the need for amendments at step 1420.

Therefore, if either the inquiry at step 910 or the inquiry at step 930 is answered in the affirmative, and it is therefore determined that a deal has been made, processing then passes to step 950 where shipping and delivery of the purchased product are negotiated after signing of the original or updated purchase order. Finally, at step 960 the user receives the goods, and at step 970 user satisfaction may be tracked.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A system comprising a platform for implementing user searching, comprising:
    an onboarding system for receiving information from a potential user including one or more attributes for attaching the user to one or more communities with similar attributes;
    a search receiving system for receiving one or more search terms from the user;
    a processor for performing a search based upon the received search terms and the one or more communities to which the user is attached;
    a display for displaying the response to the search to the user;
    a preference receiving system for confirming a user preference to the presented response; and
    a community update system for dynamically updating the communities to which the user is attached, and for updating the attributes of the communities to which the user is attached in response to the user preference.

2. The system of claim 1, wherein the onboarding system further receives preference from the user as to whether the user wishes to remain anonymous.

3. The system of claim 2, wherein the user remains anonymous to one or more third parties identified in response to the user search.

4. The system of claim 3, wherein the user indicates a desire to interact with the third party identified in response to the user search while still remaining anonymous.

5. The system of claim 1, further comprising determining whether a result for a particular search is consistent with one or more existing communities, and if it is determined that the result for the particular search is not consistent with one or more existing communities, generating a new community associated with the results of the particular search.

6. The system of claim 5, further comprising onboarding a new third party associated with the results of the particular search resulting in the generating of the new community.

7. A system for implementing user searching while remaining anonymous, comprising:
    a user onboarding system for receiving information from a potential user including one or more wants, needs, and desires for attaching the user to one or more communities with similar wants, needs, and desires;
    a provider onboarding system receiving information from a provider related to one or more search results to be provided to a user upon matching the search of the user;
    a search receiving system for receiving one or more search terms from the user;
    a matching system for matching the one or more descriptions to the wants, needs, and desires of one or more communities with the information related to the information provided by the one or more providers; and
    a publishing system for publishing to the matched one or more communities the information related to the information provided by the one or more providers matching the wants, needs, and desires of the one or more communities.

8. The system of claim 7, further comprising an input system for receiving one or more inputs from the user in response to the published information; and
    a community update system for updating the communities to which the user is attached, and for updating the wants, needs, and desires of the communities to which the user is attached in response to the user input.

9. The system of claim 7, wherein the matching system comprises an artificial intelligence machine learning routine for matching the published information to the wants, needs, and desires of one or more communities.

10. A method for implementing user searching, comprising:
    receiving information from a potential user by an onboarding system including one or more attributes for attaching the user to one or more communities with similar attributes;
    receiving one or more search terms from the user by a search system;
    performing by a processor a search based upon the received search terms and the one or more communities to which the user is attached;
    displaying the response to the search to the user on a display;
    confirming a user preference to the presented response by a preference system; and
    dynamically updating the communities to which the user is attached, and updating the attributes of the communities to which the user is attached in response to the user preference.

11. The method of claim 10, further comprising receiving by the onboarding system a preference from the user as to whether the user wishes to remain anonymous.

12. The method of claim 11, wherein the user remains anonymous to one or more third parties identified in response to the user search.

13. The method of claim 12, wherein the user indicates a desire to interact with the third party identified in response to the user search while still remaining anonymous.

14. The method of claim 10, further comprising determining whether a result for a particular search is consistent with one or more existing communities, and if it is determined that the result for the particular search is not consistent with one or more existing communities, generating a new community associated with the results of the particular search.

15. The method of claim 14, further comprising onboarding a new third party associated with the results of the particular search resulting in the generating of the new community.

16. A method for implementing user searching while remaining anonymous, comprising:
    receiving information from a potential user by a user onboarding system including one or more wants, needs, and desires for attaching the user to one or more communities with similar wants, needs, and desires;
    receiving information from a provider by a provider onboarding system related to one or more search results to be provided to a user upon matching the search of the user;
    receiving one or more search terms from the user by a search receiving system;
    matching the one or more descriptions to the wants, needs, and desires of one or more communities with the information related to the information provided by the one or more providers by a matching system; and publishing to the matched one or more communities the information related to the information provided by the one or more providers matching the wants, needs, and desires of the one or more communities to a platform accessible by both users and providers.

17. The method of claim 16, further comprising receiving one or more inputs from the user by an input system in response to the published information; and
updating the communities to which the user is attached, and for updating the wants, needs, and desires of the communities to which the user is attached in response to the user input.

18. The method of claim 16, wherein an artificial intelligence machine learning routine is employed for matching the published information to the wants, needs, and desires of one or more communities.

* * * * *